UNITED STATES PATENT OFFICE.

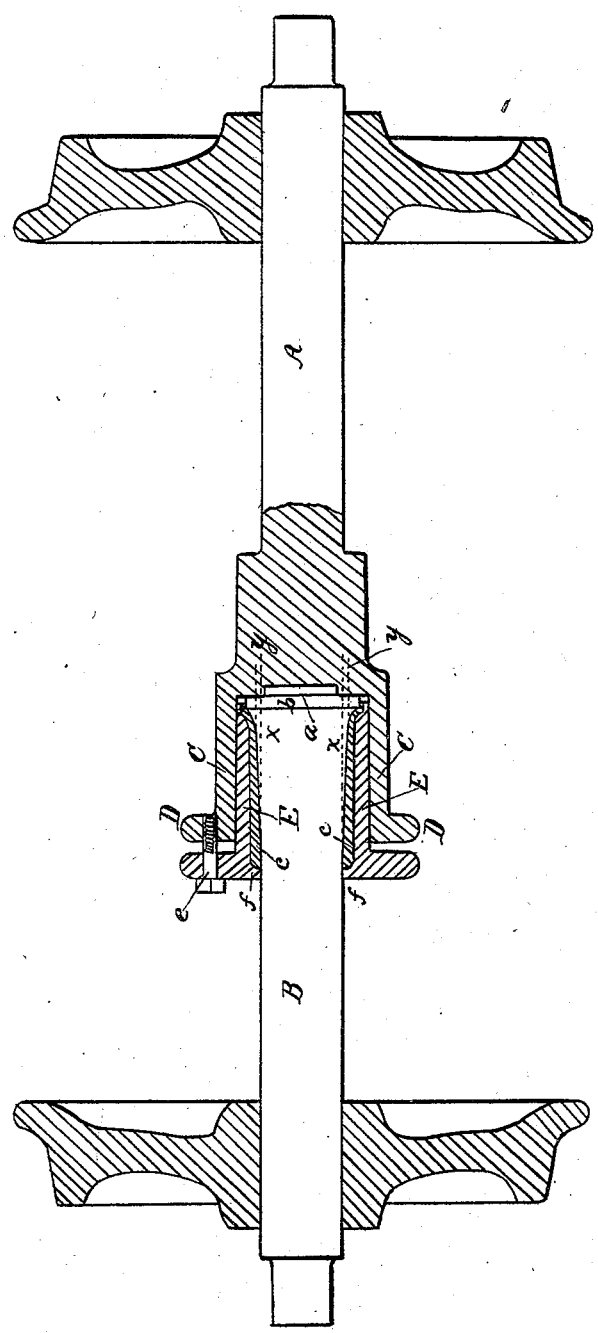

SAML. L. DENNEY, OF CHRISTIANA, PENNSYLVANIA.

DIVIDED RAILROAD-AXLE.

Specification of Letters Patent No. 10,471, dated January 31, 1854.

*To all whom it may concern:*

Be it known that I, SAMUEL L. DENNEY, of Christiana, in the county of Lancaster and State of Pennsylvania, have invented a new and useful Improvement in Divided Car-Axles; and I do hereby declare that the following is a full and exact description thereof, reference being had to the accompanying drawing, making part of this specification and representing a longitudinal section through the center of a car axle constructed in my improved manner and of the wheels thereon.

The nature of my invention consists in forming a gradual conical enlargement, for a considerable distance, toward the inner end of one part of the divided axle, and terminating said enlargement with greater and constantly increasing abruptness to the end of the axle; and inserting the enlarged end thereof in a cylindrical box, which connects it with the other part of the combined axle, and whose cavity is large enough to admit a layer of some soft metallic alloy to be cast around said enlargement; for the purpose of rendering the combined axle sufficiently inflexible not to wabble, and also to allow one part of it to freely turn independently of the other while traversing curves of the road, substantially as hereinafter described.

In the drawing, A, represents the part of the divided axle, which is borne by one wheel, and B, represents the part borne by the other wheel. The latter has a gradual conical enlargement toward its inner end, in the portion between the red lines $x$ $x$, and $y$ $y$; but in the short distance from $y$ $y$, to the head $b$, the enlargement becomes much more abrupt and constantly increases, so that it forms a curved outline, as represented. A cylindrical connecting box E, of the proper length, surrounds said enlarged portion of the partial axle B, and is provided with a cavity sufficiently large to leave a considerable space $c$, around the axle, which is filled with any suitable soft alloy, (such as Babbitt metal,) while its aperture at $f$, contracts to the size of the axle, in order to prevent the said alloy from being forced out of the cavity by pressure. This connecting box is inserted closely in the enlarged end C, of the partial axle A, and is held therein by means of flanges both upon the connecting box and axle, (as shown in the drawing,) and of screws $e$, passing through the flanges. The same device also serves to again bring the head $b$, of the axle B, which projects a little beyond the connecting box, in contact with the bottom of the cavity in the axle A, whenever their surfaces wear away; and also to tighten the packing (it might be called) $c$, upon the conical enlargement, whenever necessary. There may be a smaller portion $a$, of the axle B, projecting beyond the head $b$, to fit into a corresponding depression in the axle A, and thereby hold the axles in proper position, while casting the alloy $c$, into its cavity; but this is not a necessary part of my invention.

The practical result and operation of the above described improvement, are these:— The conical portion of the axle B, extends a considerable distance and fits closely in the alloy which surrounds it, and thus renders the connection of the joint sufficiently close and firm to give the combined axles all the necessary inflexibility of a single solid axle; and whenever the connection wears loose, by simply tightening the screws $e$, it again becomes firm and rigid by the wedge action of the conical enlargement. But the curved portion of said enlargement is sufficiently abrupt to prevent the wedge action of the conical portion from so tightly binding the parts as not to permit the axle B, to turn in the axle A, and, at the same time, gradual enough to allow a proper effect of the wedge action; the desired degree of which is readily ascertained by experiment, but for which no definite rule can be given. This combined conical and curved form of the enlargement I find to be the only effectual means of accomplishing the desired result; since, if the conical part terminated in a rectangular shoulder, or in another much shorter cone, the proper wedge action for tightening, could not be obtained; and if simply the gradual cone were employed, or another conical portion a little more abrupt, were added, the limit to the wedge action could not be properly adjusted and controlled. But as above arranged, the two parts of the axle will, on a straight track, turn together precisely as a simple solid axle, the length of the conical portion and the closeness of the alloy packing, being such as to prevent any wabbling; but when traversing a curve, the friction of the soft alloy is not so great as to prevent one axle from turning independently of the other, and thus enables the wheel on the outer rail of the curve, to keep pace with its fellow.

Having thus fully described my improvement in divided car axles, what I claim therein as new and desire to secure by Letters Patent, is—

The gradual conical enlargement, terminating in the more abrupt curved portion, toward the inner end of one part of the axle, in combination with the alloy surrounding it and the adjustable connecting box, arranged and operating as described.

The above specification of my new and useful improvement in divided car axles, signed by me this 11th day of January 1854.

SAML. L. DENNEY.

Witnesses:
 J. S. BROWN,
 J. W. PATTERSON.